(12) United States Patent
Ogilvie

(10) Patent No.: US 7,130,830 B2
(45) Date of Patent: Oct. 31, 2006

(54) PROVIDING NOTICE OF PATENT RIGHTS

(76) Inventor: John W. L. Ogilvie, 1211 E. Yale Ave., Salt Lake City, UT (US) 84105

( * ) Notice: Subject to any disclaimer, the term of this patent is extended or adjusted under 35 U.S.C. 154(b) by 703 days.

(21) Appl. No.: 10/263,548

(22) Filed: Oct. 2, 2002

(65) Prior Publication Data

US 2003/0069850 A1    Apr. 10, 2003

Related U.S. Application Data

(60) Provisional application No. 60/327,889, filed on Oct. 9, 2001.

(51) Int. Cl.
*G06Q 99/00* (2006.01)

(52) U.S. Cl. ....................................................... 705/51

(58) Field of Classification Search ............ 705/50–59; 713/167, 200–201; 380/201–202
See application file for complete search history.

(56) References Cited

U.S. PATENT DOCUMENTS

| | | | |
|---|---|---|---|
| 6,119,108 A * | 9/2000 | Holmes et al. ................ 705/40 |
| 6,138,119 A | 10/2000 | Hall et al. ...................... 707/9 |
| 6,171,112 B1 | 1/2001 | Clark et al. .................. 434/322 |
| 6,330,670 B1 | 12/2001 | England et al. ................ 713/2 |
| 6,356,903 B1 | 3/2002 | Baxter et al. ................. 707/10 |
| 6,389,458 B1 | 5/2002 | Shuster ...................... 709/213 |
| 7,082,399 B1 * | 7/2006 | Utsumi .......................... 705/1 |
| 2001/0047338 A1 * | 11/2001 | Jones ........................... 705/51 |
| 2002/0082937 A1 * | 6/2002 | Retherford .................... 705/26 |
| 2002/0165726 A1 * | 11/2002 | Grundfest ....................... 705/1 |
| 2003/0023528 A1 * | 1/2003 | Wilce et al. .................. 705/35 |

FOREIGN PATENT DOCUMENTS

WO   WO 200197049 A1 * 12/2001

OTHER PUBLICATIONS

Samuelson, "The Never-ending Struggle for Balance", Communications of the ACM, v40n5, pp. 17-21, May 1997, ISSN: 0001-0782.*
Screen shot of legal notice in Microsoft World 2000, copyright 1983-1999.
Harmon, Patents and the Federal Circuit (5th Ed.), title page, copyright page, pp. 542-549; copyright date no later than 2001.
Lundberg et al., Electronic and Software Patents: Law and Practice, title page, copyright page, pp. 457-460; copyright date 2000.
Sandburg, "Fair Use Fears Over Federal Circuit Ruling", in The Recorder, from www.law.com website, Oct. 8, 2002.
Hamblett, "Internet Users Not Bound by Hidden License Agreements", in New York Law Journal, From www.law.com website, Oct. 2, 2002.

* cited by examiner

*Primary Examiner*—Mary D. Cheung
(74) *Attorney, Agent, or Firm*—Ogilvie Law Firm

(57) ABSTRACT

The present invention provides tools and techniques for providing users of devices with actual notice of patent rights by displaying applicable patents, or by allowing users to indicate they have previously reviewed those patents, or both, before permitting use of core features of the device.

14 Claims, 1 Drawing Sheet

've already looked at U.S. Pat. No. _____ ; Thanks." An

PROVIDING NOTICE OF PATENT RIGHTS

RELATED APPLICATIONS

This application claims priority to commonly owned copending application Ser. No. 60/327,889 filed Oct. 9, 2001, which is incorporated herein by reference.

FIELD OF THE INVENTION

The present invention relates generally to notification of legal rights, and in particular relates to tools and techniques which notify users of patents covering a system and/or method, and give the user an opportunity to view the patent(s), before the user is allowed to use patented and/or core features of the patented system and/or method.

TECHNICAL BACKGROUND OF THE INVENTION

Click-through agreements (e.g., beta license agreements, non-disclosure agreements, end user license agreements) are often presented to users in a manner that prevents user access to core system features of a software program unless and until the user agrees to the terms and conditions of the agreement The proposed agreement is presented to the user, with buttons labeled "I AGREE" and "I DO NOT AGREE" or the like. The user has an opportunity to review the agreement, and could even pick up the phone or otherwise contact and consult with counsel. If the user clicks the "I DO NOT AGREE" button, the user is denied access to core system features of the program or computer system; if the user clicks the "I AGREE" button, the user is given access to those features.

Sometimes a click-through agreement lists patent numbers in the text of the agreement. However, such click-through arrangements have apparently not previously been configured to present the actual text of a patent that is said to cover the software program, and to have the user confirm that the user has seen that patent, before giving the user access to core system features of the patented program or system. By contrast, an embodiment of the present invention does take steps to notify users of patents covering a system and/or method, and to give the user an opportunity to view the patent, before the user is allowed to use the patented system and/or method.

BRIEF SUMMARY OF THE INVENTION

The invention provides tools and techniques which provide notice of patent rights by making it difficult or effectively impossible for a computer system user to use core system features without having first been advised that those features and/or one or more of their uses are covered by one or more identified patents, and also having been shown the patent(s) (or otherwise put on actual notice) before getting access to the core system features. The core system features may be patented, or unpatented but highly desired provided the patent is not misused.

In addition to patent rights, the invention may be used to provide actual notice of other legal rights, including without limitation other intellectual property rights such as copyright, trademark, and/or trade secret rights. The present inventor was a professional computer programmer for several years, and is presently a registered patent attorney with an active law practice comprising patent and other intellectual property matters for clients who include individual and corporate software developers and vendors. The present invention is defined by the claims, and to the extent this summary conflicts with the claims, the claims prevail.

BRIEF DESCRIPTION OF THE DRAWING

To illustrate the manner in which the advantages and features of the invention are obtained, a more particular description of the invention will be given with reference to the attached drawing. This drawing only illustrates selected aspects of the invention and thus do not fully determine the invention's scope, e.g., it only shows methods, whereas both methods and generally corresponding systems are claimed. The drawing is closely based on, and reflects, the text of this application and the incorporated provisional application.

DETAILED DESCRIPTION OF EMBODIMENTS

Figure 1:
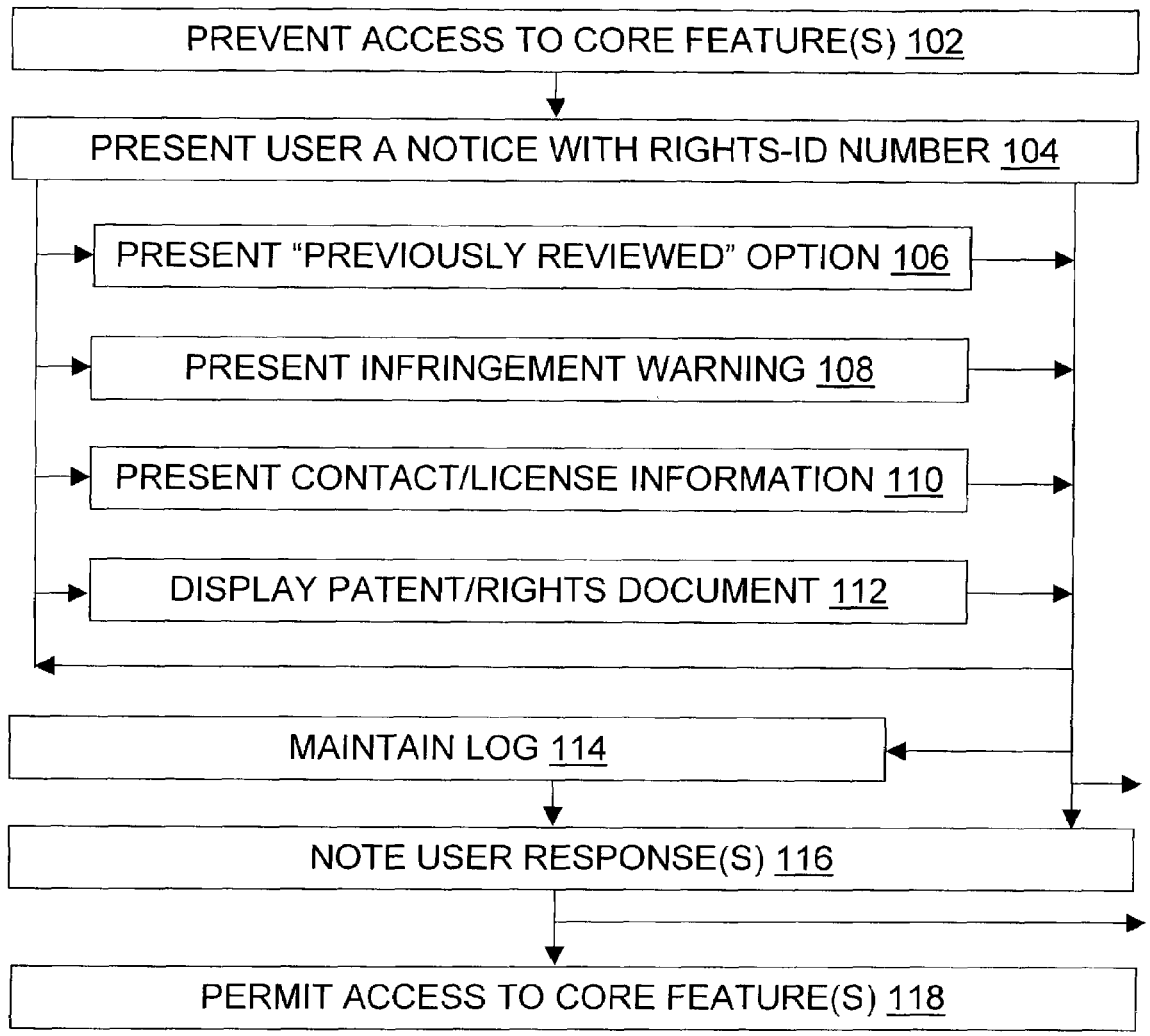
FIG. 1 is a flowchart illustrating methods of the present invention, at least some of which may also be implemented in systems according to the invention.

In describing the invention, the meaning of several important terms is clarified, so the claims must be read with careful attention to these clarifications. Specific examples are given to illustrate aspects of the invention, but those of skill in the relevant art(s) will understand that other examples may also fall within the meaning of the terms used, and hence within the scope of one or more claims. Important terms may be defined, either explicitly or implicitly, here in the Detailed Description and/or elsewhere in the application file. In particular, an "embodiment" of the invention may be a system, an article of manufacture, a method, and/or a signal which configures a computer memory or other digital or analog computer-readable medium as described herein to one of skill.

In one embodiment according to FIG. 1, the present invention initially bars 102 the user from access to at least one feature of the program or device. This may be done using familiar access control barriers, such as those employed with authentication to implement password-controlled access, certificate-controlled access, and other identity-controlled access. In the present embodiment access is controlled to enforce notice of patent or other legal rights. The present invention may be combined with access controls that enforce limitations on the identity of users, although it may also be used separately from such identity-based access controls.

The embodiment presents 104 a user with a notice statement such as "This product is covered by U.S. Pat. No. _____", where the blank is replaced by the actual patent number. Other jurisdictions and/or additional patent numbers may be presented 104 in the notice statement. The preface "This product is covered by" may be worded differently or omitted. The patent number may be plain text, or it may be active text such as a hyperlink or button, so that selecting or clicking on it displays 112 a copy of the patent to the user. Copyright, trademark and other notices may be included with the presented 104 patent notice, The notice statement may be accompanied 106 by a statement acknowledging previous receipt of notice, such as "I have previously reviewed all those patents" or "I've already looked at U.S. Pat. No. _____ ; Thanks." An implicit command sequence or an explicit button or other active text takes 116 the user to the core features 118 after the user has seen the patent(s) or, in some embodiments but not all, after the user has acknowledged 116 previously reviewing those patents. If the acknowledgement of previous notice 106 is present, and is activated 116 by the user, the possibility exists that the user has not actually previously seen the patent(s) and—for some reason—does not want to review the patent(s) at this time. One embodiment emails 112 copies of the patents to the user despite that, and another prints 112 the patent.

But one embodiment simply accepts 116 the user's representation at face value, and moves on by giving 118 the user access to the core features which are, after all, the main reason most users want to use the program. If the user actively represents 116 that the user has previously seen the patent but has not actually done so, then the user is lying about having seen the patent. From the patentee's point of view in enforcement proceedings, this embodiment may reduce the strength of an argument that the user received actual notice of the patentee's rights, but it also provides an argument that the user lied about having seen the patent in order to gain access to the patented system's functionality.

The notice statement may be accompanied by 108 a statement to the effect that if the user is not properly licensed and does not own the patent rights in question, then this use of the program is an infringing use, and it may include a way 110 to help the user determine if he or she is properly licensed. For instance, contact information for the patentee may be provided 110 to permit a user to inquire of the program's vendor whether the user is properly licensed for the program and the use of the program in question. Also, the name of the licensee may be displayed 110, so the user is on notice of infringement if the displayed licensee name is not the user's name.

The notice statement may be accompanied by 108 a statement to the effect that if the user is not properly licensed and does not own the patent rights in question, then making copies of the patented program constitutes contributory or direct infringement, depending on the patent claims. If the patent contains claims for media configured to operate according to a specified method, for instance, then making such configured media is direct infringement. If the patent only claims methods that are performed by the software, and does not claim copying media configured to perform such methods, then the infringement from copying the program onto other disks, RAM, etc. would likely be contributory rather than direct.

The notice statement step(s) 104–112 and core feature access control steps 102, 116, 118 described herein may be performed on installation of the program, on the first attempted execution of the program, or on the first attempted execution of the program by a particular user. It would be possible, but inconvenient, to perform the access control each time the program is run. Evidence that the program was run may come from the program itself, if it keeps 114 an internal log and/or sends usage information 114 over a network connection to the vendor. Evidence of program usage may also come from testimony given under oath in court, for instance. If the user has information that is disclosed only within the program and only after presentation 112 of the patent and of the notice 104 (or after acknowledgment 116 of previous such presentation), then that fact may also serve as evidence supporting a conclusion that the user ran the program, and hence that the user received notice provided according to the present invention.

The invention goes beyond conventional marking under 35 U.S.C. § 287 by providing not only the patent number (or other rights ID number such as a government-provided registration number) but also at least an option to view the patent itself before program core feature use. In some embodiments, the invention goes even further, by refusing to give access to the program's core features unless and until the patent is displayed to the user and the user is notified that unlicensed use of the program constitutes patent infringement.

Conventionally, actual notice of infringement is typically done by sending the alleged infringer a letter with a copy of the patent, a statement identifying the accused device or process, and a statement to the effect that patentee believes the accused device or process infringes the enclosed patent. Sometimes the patent is not included but is instead identified by number. The accused device is typically one not being made by the patentee; often it is a device that draws sales away from the patentee's own device.

By contrast, the present invention puts infringement notices in the patentee's product, with language specifying that unlicensed uses of that product are infringing uses. The accused device is an illegally made or otherwise improperly used copy of the patentee's own device (e.g., program, or system such as a personal computer or network elements configured with the program). The actual notice is not in a letter sent to a specific alleged infringer, but is rather displayed by software (and/or hardware, e.g., computer, personal electronics device, consumer electronics device, tool, etc.). The device that displays the notice to infringers is similar or identical to that which is also used (in one copy or another) by licensed users. Whether the display to alleged infringers constitutes actual notice for the purpose of determining when damages began to accrue, and/or constitutes notice for the purpose of establishing willful infringement of the patent, will be ultimately determined in particular cases in court.

But it will be extremely hard for an alleged infringer to successfully argue they had no knowledge of the patent and its coverage of the device if they ever used the device's core features. This is because the only way to use a device (program, system, or otherwise) configured according to the present invention is: (a) to be presented with the patent or other instrument and a chance to review it before being given access to the device's core features; (b) to affirmatively represent and acknowledge that they have previously reviewed the patent/instrument and understand that it covers at least some of the device's features, again before being given access to the device's core features; or (c) to actively evade the program code/hardware restrictions that present the patent notice, e.g., by jumping around it inside a debugger or physically tampering with the hardware. Note that tampering with the device to prevent it from presenting the patent notice and patent for review may constitute unfair competition, may be a misrepresentation under the Lanham Act, and may be otherwise illegal.

The invention also includes displaying 112 other documents in place of, or in addition to, a patent, when such other documents have the same or similar notice requirements as patents. That is, the invention may be used to ease the burden of proving that someone who attempts to use 118 a particular piece of computer software and/or hardware technology has been shown 112 a particular legal instrument before being given access 118 to the core features of the technology piece in question. Access 118 to the technology piece may be made consideration (in the contractual sense) for reviewing and acknowledging review 116 (or opportunity therefore) of the legal instrument, and vice versa.

Embodiments such as the methods illustrated or corresponding systems may omit items/steps, repeat items/steps, group them differently, supplement them with familiar items/steps, or otherwise comprise variations on the given examples. Suitable software to assist in implementing the invention is readily provided by those of skill in the pertinent art(s) using the teachings presented here and programming languages and tools such as C++, C, Java, Pascal, APIs, SDKs, assembly, firmware, microcode, and/or other languages and tools.

Although particular embodiments of the present invention are expressly illustrated and described herein, it will be appreciated that discussion of one type of embodiment also generally extends to other embodiment types. For instance, the description of the methods illustrated in FIG. 1 also helps describe systems which operate according to those methods, comprising a combination of standard components (e.g., processors, screens) and configuring components (e.g., software, circuitry according to the specific steps illustrated). All claims as filed are part of the specification and thus help describe the invention, and repeated claim language may be inserted outside the claims as needed.

As used herein, terms such as "a" and "the" and designations such as "displaying" and "statement", are inclusive of one or more of the indicated item or step. In particular, in the claims a reference to an item generally means at least one such item is present and a reference to a step means at least one instance of the step is performed.

The invention may be embodied in other specific forms without departing from its essential characteristics. The described embodiments are to be considered in all respects only as illustrative and not restrictive. Headings are for convenience only. The scope of the invention is, therefore, indicated by the appended claims rather than by the foregoing description. All changes which come within the meaning and range of equivalency of the claims are to be embraced within their scope to the full extent permitted by law.

What is claimed is:

1. A method for providing notice of patent rights, comprising the computer-implemented steps of:
    presenting a notice to a device user indicating that the device is subject to rights under a patent; and
    preventing, through program code/hardware restrictions, user access to at least one feature of the device unless and until an indication is made that the user has reviewed the patent;
    and at least one of: displaying a copy of the patent to the user in response to the user following a hyperlink, allowing the user to assert that the user has previously reviewed the patent; and then
    allowing the user access to the feature, said access having been previously prevented by the preventing step;
    thereby confirming that the user has actual notice of the patent and its purported coverage of the device.

2. The method of claim 1, wherein the device comprises at least one of computer software, a computer processor, and a network connection.

3. The method of claim 1, further comprising the step of presenting an infringement warning to the user.

4. The method of claim 1, further comprising the step of presenting license information to the user, thereby assisting the user in determining whether the user has a license under the patent.

5. The method of claim 1, further comprising the step of presenting patentee contact information to the user.

6. The method of claim 1, further comprising the step of maintaining a log indicating at least an indication of the user's identity, the indication comprising at least one of a name, an address, a customer number, an account number, an email address, an IP address, or a domain name that is associated with the user.

7. The method of claim 1, further comprising at least one of: emailing a copy of the patent to the user, printing the patent for the user.

8. The method of claim 1, wherein the device includes a program and the preventing step is performed on at least one of the following: on an installation of the program, on a first attempted execution of the program, or on a first attempted execution of the program by the user.

9. A device configured to provide notice of patent rights, comprising:
    a notice to a user of the device indicating that the device is subject to rights under a patent;
    a screen capable of displaying the patent; and
    a program code/hardware restrictions barrier preventing the user from accessing at least one feature of the device unless and until an indication is made that the user has reviewed the patent, thereby confirming that the user has actual notice of the patent and its purported coverage of the device, by at least one of the following: the screen displays a copy of the patent to the user, the screen displays a hyperlink to a copy of the patent, the user asserts that the user has previously reviewed the patent.

10. The device of claim 9, wherein the device comprises software, a processor, and a display screen.

11. The device of claim 9, further comprising an infringement warning to the user.

12. The device of claim 9, further comprising license information presented to the user.

13. The device of claim 9, further comprising patentee contact information presented to the user.

14. The device of claim 9, in combination with a log containing at least an indication of the user's identity and a date indicating when the patent was displayed to the user or indicating when the user asserted that he or she had previously reviewed the patent.

* * * * *